United States Patent [19]

Giles

[11] Patent Number: 4,781,443
[45] Date of Patent: Nov. 1, 1988

[54] ELECTRICALLY CONDUCTING POLYMERS

[75] Inventor: Jeremy R. M. Giles, Worthing, England

[73] Assignee: The Secretary of State for Defence in Her Britannic Majesty's Government of the United Kingdom of Great Britain and Northern Ireland, London, England

[21] Appl. No.: 26,696
[22] PCT Filed: Jul. 11, 1986
[86] PCT No.: PCT/GB86/00403
§ 371 Date: May 8, 1987
§ 102(e) Date: May 8, 1987
[87] PCT Pub. No.: WO87/00677
PCT Pub. Date: Jan. 29, 1987

[30] Foreign Application Priority Data

Jul. 12, 1985 [GB] United Kingdom .................. 8517622

[51] Int. Cl.$^4$ .................... H01B 1/12; H01M 4/60; C08G 61/12; C25B 3/10
[52] U.S. Cl. .................... 350/357; 252/500; 252/512; 252/518; 528/380; 528/423; 526/256; 526/258; 429/213; 204/59 R
[58] Field of Search .................. 252/500, 512, 518; 528/380, 423; 526/256, 258; 429/213; 204/59 R

[56] References Cited

U.S. PATENT DOCUMENTS

| | | | |
|---|---|---|---|
| 3,335,075 | 8/1967 | Borman | 204/59 R |
| 3,615,384 | 10/1971 | Gripstein et al. | 430/75 |
| 4,090,782 | 5/1978 | Brodfeldt | 350/357 |
| 4,548,696 | 10/1985 | Weaver, Jr. | 204/290 R |
| 4,582,587 | 4/1986 | Hotta et al. | 204/291 |
| 4,694,062 | 9/1987 | Jenekhe et al. | 252/500 |
| 4,729,851 | 5/1988 | Bräunling et al. | 252/500 |

FOREIGN PATENT DOCUMENTS 60-240721 5/1984 Japan .
60-240720 5/1984 Japan .

OTHER PUBLICATIONS

Macromolecules, vol. 18 #10, Oct. 1985, "Qualitative Evaluation of the Band Gap in Polymers with Extended II Systems by Olof Wennerstrom, pp. 1977–1980.
Polymer Preprints, vol. 27 #2, Sep. 1986, "Synthesis of Conjugated Polymers via Polymer Elimination Reactions" by S. A. Jenekhe, pp. 74–75.
Journal of the Chemical Society, #15, Aug. 1, 1985, "Defect States in Poly(p-Phenylene Methine) and Similar Materials" by J. R. M. Giles, pp. 1030–1033.

Primary Examiner—Paul Lieberman
Assistant Examiner—Ronald A. Krasnow
Attorney, Agent, or Firm—Nixon & Vanderhye

[57] ABSTRACT

An electrically conducting organic material for use on battery electrodes and the like, which comprises a polymer optionally doped with an n- or p-type dopant, wherein the polymer contains along its backbone at least one π-conjugated linear unit of formula (i), wherein A is a divalent optionally-substituted conjugated organic cyclic group containing a π-conjugated sequence of single bonds and at least two double bonds; B is a tetravalent optionally-substituted conjugated organic cyclic group containing a π-conjugated sequence of single bonds and at least one double bond; A and B have the same molecular and structural formula except that they contain a different configuration of double and single bonds; Y is a trivalent group containing m linking atoms between adjacent groups A and B where m is an odd number from 1 to 11, provided that when Y contains more than one linking atom between said adjacent groups, the linking atoms form a π-conjugated chain of atoms between said adjacent groups A and B, and n is an integer from 1 to 4. One example of the material is poly(2,2'-dipyrrylmethane) doped with $CF_3SO_3$ ions, which is relatively air-and water-stable and has a conductivity of about 1.0S cm$^{-1}$.

16 Claims, 1 Drawing Sheet

ELECTRICALLY CONDUCTING POLYMERS

This invention relates to electrically conducting polymers, to films of these polymers on electrodes, and to processes for preparing these polymers.

For several years it has been known that organic polymers containing a $\pi$-conjugated backbone structure have desirable electrical conductivities for a range of applications. These applications include coatings on electrodes for batteries, galvanic cells, and electrochromic display devices. Probably the best known of these polymers is polyacetylene, especially trans-polyacetylene. These polymers may be doped with conductivity increasing amounts of an electron acceptor (p-type) dopant and/or a conductivity-decreasing amount of an electron donor (n-type) dopant to produce families of polymeric materials whose conductivities range from semiconductor behaviour to metallic behaviour. Methods of doping these polymers with n- and/or p-type dopants are disclosed in U.S. Pat. Nos. 4,204,216, 4,222,903, and 4,321,114. Polyphenylene is another conducting polymer disclosed in these patents.

More recently, a series of heterocyclic monomer-based homopolymers have been developed which, to a certain extent, overcome some of the main disadvantages of polyacetylene that include environmental instability and instability in the presence of electrolytes and dopant ions. These include polypyrrole which has been used in electrochromic display devices (Inganas and Lundstrom, J Electrochem Soc (1984) 131(5), 1129-1132 and U.S. Pat. No. 4,304,465). However, it is reported by Inganas and Lundstrom that polypyrrole is readily attacked by oxygen and electrolytes, necessitating ring substitution on the N heteroatom which is not always desirable for other reasons. Similar ring substitution is disclosed in EP-A-No. 0095973 which discloses polymers of pyrrole, thiophene and furan that are substituted in the 3 and/or 4 ring positions with groups such as alkyl, cyano and halo. These polymers are disclosed as useful in batteries.

BRIEF DESCRIPTION OF DRAWING

Accompanying

Figure 1:
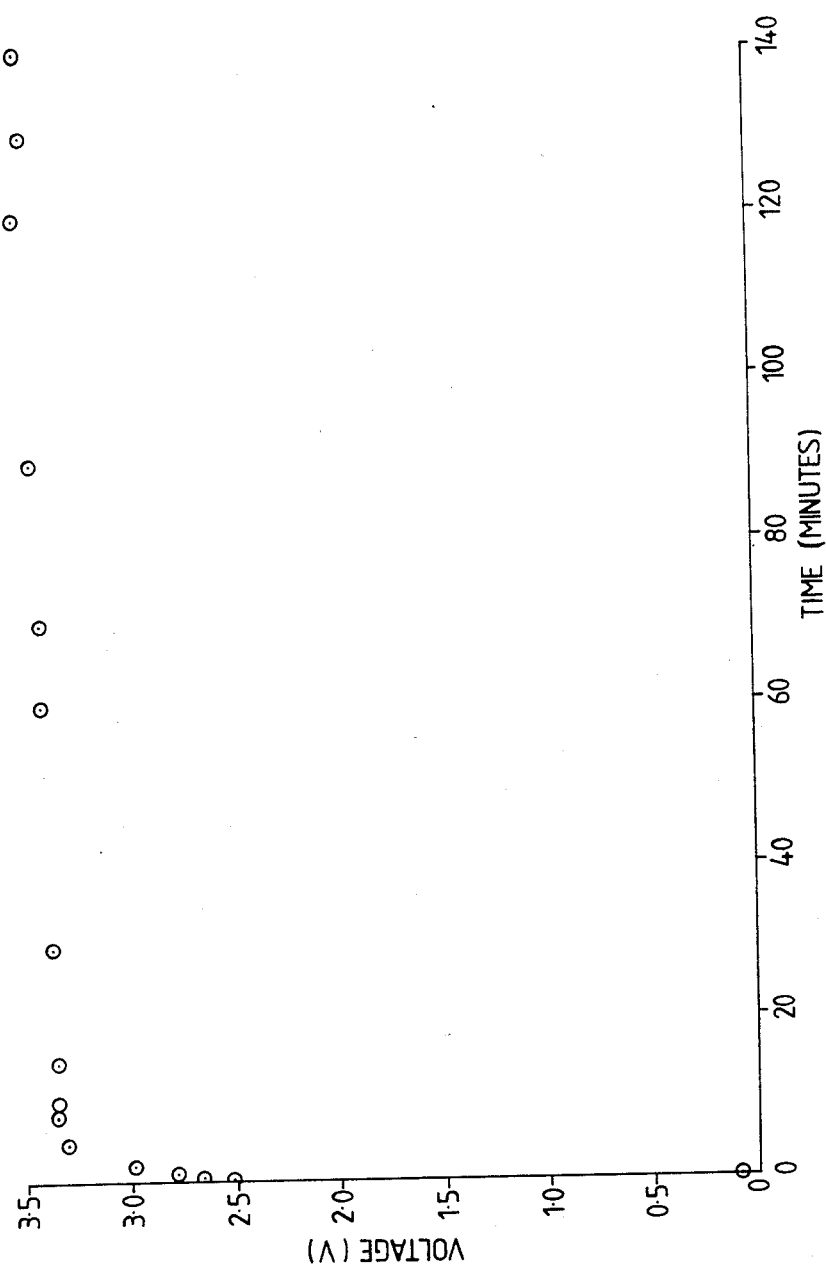
FIG. 1 is a graphical representation of the polymerisation potential against polymerisation time characteristics for the electrochemical polymerisation of 2,2'-dipyrrylmethane described in Example 1.

It is one object of the present invention to provide an alternative, novel conducting polymer which in some instances provides an alternative to ring substitution for stabilising cyclic monomer-based conducting polymers.

According to a first aspect of the present invention there is provided an electrically conducting organic material which comprises a polymer optionally doped with an n- or p-type dopant, wherein the polymer contains along its backbone at least one $\pi$-conjugated linear unit of formula I

                                                    I wherein A is a divalent optionally-substituted conjugated organic cyclic group containing a $\pi$-conjugated sequence of single bonds and at least two double bonds;

B is a tetravalent optionally-substituted conjugated organic cyclic group containing a $\pi$-conjugated sequence of single bonds and at least one double bond;

A and B have the same molecular and structural formula except that they contain a different configuration of double and single bonds;

Y is a trivalent group containing m linking atoms between adjacent groups A and B where m is an odd number from 1 to 11, provided that when Y contains more that one linking atom between said adjacent groups, the linking atoms form a $\pi$-conjugated chain of atoms between said adjacent groups A and B, and n is an integer from 1 to 4. The polymer will normally be copolymer of the groups A, B and Y and contain several repeat units of Formula I.

A and B are preferably independently selected from optionally-substituted homocyclic groups containing less than 7 ring atoms and optionally-substituted heterocyclic groups containing less than 7 ring atoms. As an example of a suitable homocyclic group, A may be an optionally-substituted p-phenylene group and B a corresponding optionally-substituted 1,4 cyclohexadiene group of formula

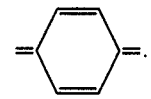

More preferably, however, the linear unit is of general formula II

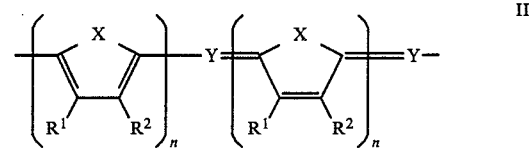
                                                    II wherein X is a Group VIa atom or an optionally-substituted Group Va atom, and $R^1$ and $R^2$, when taken separately, are the same or different and each is selected from the group consisting of H, optionally-substituted alkyl, optionally-substituted alkoxyl, optionally-substituted aryl, optionally-substituted amino, halo and cyano or, when taken together, are optionally-substituted benzo. X is preferably NR, S or O where R is H, optionally substituted aryl, or optionally-substituted alkyl. Where any one of R, $R_1^1$ and $R^2$ consists of or contains an optionally-substituted alkyl group, the alkyl group is preferably a $C_1$–$C_5$, especially an $nC_1$–$C_5$, alkyl group. Most preferably, X is NH or S and $R^1$ and $R^2$ are both H.

The group Y in general formula I given above is preferably $(CR^3)_{2x-1}$ in which $R^3$ is H or an optionally substituted alkyl, especially a $C_1$–$C_5$ alkyl, group and x is an integer from 1 to 6. Most preferably, Y is CH. n is preferably 2 or 4, and is most preferably 2.

The polymer is preferably doped with either n-type (electron doning) cationic dopant ions, or, more preferably, with p-type (electron withdrawing) anionic dopant ions. Suitable dopants ions and methods of incorporating these ions into the polymer are disclosed in U.S. Pat. No. 4,321,114 (Heeger et al). A wide variety of dopant species may suitably be employed, either individually or in combination, for effectively modifying the room temperature electrical conductivity of the conjugated polymer in accordance with the present invention.

Suitable anionic dopant ions for effecting p-type doping include, for example, $I^-$, $Br^-$, $Cl^-$, $F^-$, $ClO_4^-$, $AlCl_4^-$, $PF_6^-$, $AsF_6^-$, $AsF_4^-$, $SO_3CF_3^-$, $BF_4^-$, $BCl_4^-$, $NO_3^-$, $POF_4^-$, $CN^-$, $SiF_3^-$, $CH_3CO_2^-$ (acetate), $C_6H_5CO_2^-$ (benzoate), $CH_3C_6H_4SO_3^-$ (tosylate), $SiF_6^{--}$, $SO_4^{--}$, or the like.

The cationic dopant ions suitable for effecting n-type doping are cations of a metal whose Pauling electronegativity value is no greater than 1.6. A complete list of such metals and their corresponding electronegativity values are provided in Table I below.

TABLE I

| Metal | Electronegativity Value |
| --- | --- |
| Cs | 0.7 |
| Rb | 0.8 |
| K | 0.8 |
| Na | 0.9 |
| Ba | 0.9 |
| Li | 1.0 |
| Sr | 1.0 |
| Ca | 1.0 |
| Mg | 1.2 |
| Y | 1.3 |
| Sc | 1.3 |
| Be | 1.5 |
| Al | 1.5 |
| Zr | 1.6 |
| Ti | 1.6 |

The above list of metals includes all of the alkali metals, all of the alkaline earth metals, and certain of the metals from Group 3 (Y, Sc and Al) and Group 4 (Zr and Ti) of the Periodic Table.

Other cations which could be used include $Fe^{2+}$, $Fe^{3+}$, and $R_4^a N^+$ where $R^a$ is a $C_1$-$C_5$ alkyl group.

Each of the anionic and cationic dopant ion species set forth above will effect an increase, to varying degrees, in the room temperature electrical conductivity of the starting conjugated polymer. For the widest range in selectivity as to achievable conductivities, the preferred cationic dopant ions are alkali metal ions, particularly $Li^+$; and the preferred anionic dopant ions are halide ions, $ClO_4^-$, $PF_6^-$, $AsF_6^-$, $AsF_4^-$, $SO_3CF_3^-$, and $BF_4^-$.

The molar ratio of cyclic groups in the polymer to dopant ions in the material preferably lies in the range 1:0.01 to 1:5.

The present polymers containing units of formula II may be prepared by the oxidation of precursor polymers having repeat units

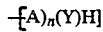

where A and Y are as defined above, to generate the required sequence of double bonds. Preferably, however, these particular polymers are prepared by chemical- or electro-oxidative polymerisation. Where n is 1, it is preferred that the polymer is prepared by the chemical oxidative co-polymerisation of monomeric precursors for example by condensation polymerisation followed by oxidation. Where n is 2, then the polymers are preferably prepared by first preparing a precursor monomer of formula HA-(Y)H-AH (eg 2,2'-dipyrryl methane), and then electro-oxidatively polymerising the monomer. The polymeric product is conveniently filmed onto the anode of a cell from a solution of the monomer conveniently containing a salt to improve the ionic conductivity of the solution. The advantage of electro-oxidative polymerisation is that the product polymer is filmed onto an electrode ready for use in, for example, a battery. Furthermore, the salt in the solution will provide a source of dopant ions that will dope the polymer during its formation and so generally improve its conductivity.

According to a second aspect of the present invention, therefore, there is provided an electrode for use in a galvanic cell, a battery, an electrochromic display device or an optical storage device, which has thereon a film of an electrically conducting organic material according to the first aspect. The thickness of the film is preferably from 0.01 microns to 2 mm, most preferably from 0.05 microns to 100 microns, depending on the use to which the electrode is to be put.

According to a third aspect of the present invention there is provided a process of depositing an electrically conducting organic material onto a substrate, which comprises electrochemically oxidising, between an anode and a cathode, a monomer of general formula III

dissolved within a solvent, wherein

A is a divalent optionally-substituted conjugated organic cyclic group containing a $\pi$-conjugated sequence of single bonds and at least two double bonds, and is preferably a hetero- or homo-cyclic group containing less than 7 ring atoms, $Y^1$ is $CR^3$ in which $R^3$ is an optionally-substituted $C_1$-$C_5$ alkyl group, p is 1 or 2, and q is an integer from 1 to 3, whereby the film is deposited onto the anode.

In general formula III, $Y^1$ is preferably CH, p is preferably 1, and q is preferably 1.

A is preferably

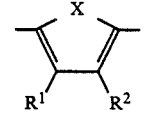

wherein X is a Group VIa atom or an optionally-substituted Group Va atom, and $R^1$ and $R^2$, when taken separately, are the same or different and each is selected from the group consisting of H, optionally-substituted alkyl, optionally-substituted alkoxyl, optionally-substituted aryl, optionally substituted amino, halo and cyano or, when taken together, are optionally-substituted benzo. X is preferably NR, S or O where R is H, optionally substituted aryl, or optionally-substituted alkyl. Where any one of R, $R_1^1$ and $R^2$ consists of or contains an optionally-substituted alkyl group, the alkyl group is preferably a $C_1$-$C_5$, especially an $nC_1$-$C_5$, alkyl group. Most preferably, X is NH or S and $R^1$ and $R^2$ are both H.

Preferred monomers of general Formula III are 2,2' dipyrrylmethane and 2,2' dithienylmethane.

The material is usually deposited as a film. The solvent preferably contains an electrolyte compound that is ionisable in the solvent to provide anionic dopant ions that dope the depositing material as electrochemical oxidation proceeds. The presence of the compound speeds up film deposition and will generally improve the conductivity of the resultant polymeric material. Suitable anionic dopant ions include any one of those listed as suitable for inclusion in the material according to the first aspect of the present invention.

One use of the materials according to the first aspect of the present invention, and, more especially, of the polymeric product of the process according to the third aspect of the present invention, is in batteries and the like.

Conventional battery systems such as the nickel-cadmium or lead-acid types suffer from the problem of low energy densities. Alternative lithium anode based batteries have much improved theoretical energy densities and high values are achieved in practicable cell arrangements such as by using the lithium/thionyl chloride and lithium/sulphur dioxide couples. Excellent power densities and open circuit potentials are common although the safety aspects of such systems could be improved by using alternative electrode and electrolyte arrangements. However the chemical reversibility of such lithium cells is usually quite limited. One approach to improve the situation for the cathode has been to use lithium ion intercalants such as titanium disulphide. Another variety of material for possible electrode application includes electrically conducting polymers having extended $\pi$-conjugation sequences, the most well known example being polyacetylene; they may be used either as anodes or cathodes if a suitable doping process is possible. Again full chemical reversibility over many charge-discharge cycles is desired, however results show that for polyacetylene high coulombic efficiencies are obtained only if the material is not oxidised beyond a 6 mole % limit.

Thus the present polymeric material may be used in a galvanic cell, a photogalvanic cell, or a battery comprising an anode, a cathode and an electrolyte contained between the electrodes, wherein one or both of the active components of the electrodes comprises in part or in whole a material according to the first aspect of the present invention or, most preferably, the polymeric product of the process according to the third aspect of the present invention. It is important that the polymer film be adherent to the backing electrode and form good electrical contact. The thickness of the polymeric film formed would be controlled by the total amount of charge passed during the polymerisation. The desired thickness of film grown would be dependent on the required characteristics for the cell. A greater mass of polymer could be compatible with a cell of high capacity but would possibly give a lower current drain rate and power density under commensurate conditions as for a thinner-film electrode device. Depending on the geometry of the cell or battery site available, it is preferred that the electrode films be relatively thin, less than 50 $\mu$m and preferably less than 25 $\mu$m but thicker than 0.01 $\mu$m. Alternatively procedures for forming a film of the electrode material include casting or spin-casting from a solution of the polymer in a suitable solvent. Secondly the polymer may be deposited as an insoluble film from the polymerisation reaction.

All the cells or batteries described herein may be used in either a primary or secondary mode. The number of discharge-charge cycles, and amount of charge, as a fraction the total practicable capacity of the battery, in a typical cycle, which will be attainable will be dependent on the construction, materials and morphologies of said materials in the batteries made. However this invention is not limited or constrained by this.

The principal advantages of the polymeric materials described in this invention, over other electronically conducting polymers, are improved stability in a variety of environments and doping states, particularly high mole % doping levels. Stability to doping, most particularly p-doping of the polymers described in this invention, when in contact with aqueous electrolytes, is an advantage of the polymeric materials of this invention.

The polymeric electrode chosen from the types given in this invention may be synthesised and fabricated by conventional techniques. It is preferred that the process may be combined into a single operation, for example the monomer may undergo an electrochemically driven or photoelectrochemically driven, by appropriate choice of a semiconductor electrode, an oxidative coupling reaction to given a film of the desired polymer or an intermediate or precursor polymer. Alternatively if the polymeric electrode material is soluble in a suitable solvent, then film-formation may be achieved by solvent evaporation. If the polymer is insoluble then the synthetic procedure would be designed such that the wanted polymer is formed as a thin film covering the region allotted for the electrode. The performance of the reulting electrode may be very dependent on the nature of the morphology created. Ways of controlling this aspect using the above electrochemical synthetic route include: variation of the monomer concentration, the current density, applied potential, the material and makeup of the electrode and the electrolyte solvent ans salt. If the polymer is prepared by a conventional synthetic route or other route apart from electro-oxidation then it may be desirable to blend the electrically conducting polymer with the polymeric electrolyte if this is appropriate in order to improve mechanical and physical properties and ion transport within the body of the electrode material. Where the polymeric electrode is formed in situ in the presence of a polymeric electrolyte then this improvement of morphology and inter-phase contact may be expected to take place.

The method of fabrication of the cell may be achieved by conventional techniques however a most important aspect of the use of the materials described here is their ability to form thin coherent films so that contact areas are very high and consequently the necessary current densities may be small.

A further use of the materials according to the first aspect of the present invention and, more especially, of the polymeric product of the process according to the third aspect of the present invention, is in electrochromic display devices and in optical storage (memory) devices. An electro-chromic display is a device wherein the display effect is achieved as a consequence of a redox reaction cause by the passage of charge between a display electrode and a counter electrode, both contacted by a suitable electrolyte. Examples of conventional displays include those given in British Pat. No. 1,376,799 wherein a material undergoing the redox reaction is heptyl viologen dication. Upon passage of charge, there is reduction of the viologen and a purple film is deposited at the indicating or display electrode. On oxidation the display is erased and the viologen returns to the electrolyte. By providing a plurality of display electrodes the required complete display can be constructed. Other organic materials employed include polypyrrole and polythiophene or derivatives such as poly(3-methylthiophene) as described in U.S. Pat. No. 4,304,465; French Pat. No. 2,527,843 and European Pat. No. 0095973.

In display and memory devices, the polymer property made use of is a change in the absorption spectrum of the polymer film in contact with a backing electrode and surrounded by an electrolyte when the content of doping or oxidation state of the polymer is changed. This is normally achieved by changing the potential of the backing electrode. Thus the film may be switched between two or more levels of oxidation in order to change the nature of the display or the content of the memory. When used a memory device, the oxidation state of the film is read optically by passage of a beam of light of appropriate wavelength, not necessarily corresponding to the visible region of the electromagnetic spectrum, over the film with a reflection arrangement or through the film with a transmission arrangement. Alternatively the memory may be read electrically in which case the memory effect may be erased concurrently with the reading stage, though not necessarily so. A further method of writing the memory is to have the backing electrode as an appropriate semiconductor electrode, such that when illuminated by light (the writing step) of energy greater than the band gap between the valence and conduction bands of the semi-conductor then the polymeric film would be caused to change oxidation state. In order that a high density of information storage can be achieved either known photolithographic techniques and integrated circuit methods may be used, or alternatively techniques described in U.S. Pat. No. 4,427,513 may be utilised, for the development of desired patterns or arrays of displays or memory electrodes.

The term contrast is defined here as the difference in absorption or absorbance, or reflection or reflectance, for a particular wavelength of light, of the polymeric film in the two oxidation states considered.

The area of application of pyrrole based polymers for display and memory devices is discussed in the paper by O Inganas and I Lunstrom, J Electrochemical Society, 1984, 131, 1129–1132 and the types of device discussed and important parameters relevant to the operation of such devices may be considered also relevant to the polymers of this invention.

The polymeric film may be doped with any of the n- or p-type dopants that are described above as suitable for doping the material according to the first aspect of the present invention.

The thickness of the polymeric film covering the backing electrode is preferably from 0.01 to 5 microns and is most preferably from 0.05 to 1 microns. For the property of a desired fast switching speed between the designated oxidation states of the polymer, it is advantageous to have a thin polymeric film. For the property of a high contrast between the designated oxidation states of the polymer it may be advantageous to have a relatively thick film, thus there is a compromise between the desired properties and an optimum film thickness for a particular example of polymer would be chosen.

The fabrication of individual displays and arrays of such may be accomplished using known technologies. The final design would be dependent on the individual application. Possible uses are for displays in watches and hand calculators. Different techniques would be applied to develop high density memory storage units and the methods used may resemble those described in U.S. Pat. No. 4,427,513.

Embodiments of the present invention will now be described by way of example only with reference to the accompanying FIG. 1, which is a graphical representation of the polymerisation potential against polymerisation time characteristics for the electrochemical polymerisation of 2,2'-dipyrrylmethane described in Example 1.

MATERIALS

1. Preparation of 2,2'-dipyrrylmethane (IV)

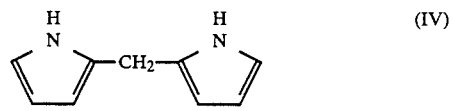

There are several known routes to the preparation of the monomer 2,2'-dipyrrylmethane (IV). The method used here is outlined below. Firstly the corresponding ketone was made using the reaction procedure outlined below:

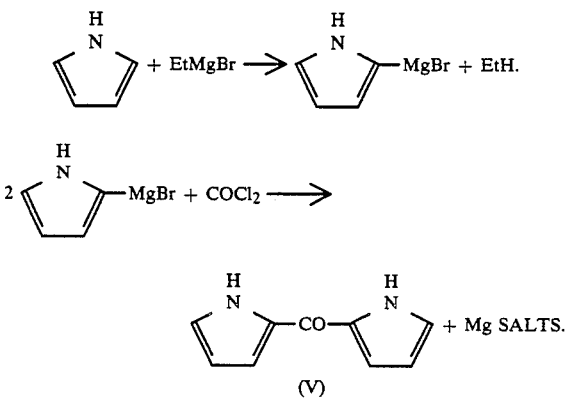

A Grignard reagent was prepared in diethyl ether by a standard method and distilled pyrrole was added to the resulting solution. After a 2 hour reflux the solution produced was added at room temperature to a solution of phosgene in toluene and reaction allowed to occur over a 16 hour period. Work-up of the reaction mixture gave the required product; the full method is described by A W Johnson and W R Overend, J C S Perkin I, 1972, 2681.

The second stage of the synthesis was the reduction of (V) by sodium borohydride as described by R Chong, P S Clezy and A J Leipa, Austral. J Chem 1969, 22, 229. The product was a solid (colourless needles) and had the required analytical properties. The material was stored in the dark under vacuum prior to use.

2. Preparation of 2,2'-dithienylmethane (VII)

0.45 mol of about 40% w/v formalin solution was added to 0.4 mol $ZnCl_2$ and 0.6 mol thiophene in 41 $cm^3$ HCl (specific gravity, 1.0) at $-7°$ C., and the reaction mixture was stirred for 2 hours at $-7°$ C. Water (80 $cm^3$) was then added and the reaction contents extracted with diethyl ether. The extracts were washed successively with water and sodium bicarbonate and dried over anhydrous calcium chloride. On removal of the solvent the product was vacuum distilled at 1.33 KPa. The majority (ca. 25 g) of (VII) was collected at 130°–135° C. The final product obtained after redistillation was recrystallised from ethanol/pet.ether.

The full method is described by Y. L. Goldfarb and Y. L. Danyushevski, Bull. Acad. of Sci. USSR, Div. Chem. Sci., 1956, 1395.

SPECIFIC EXAMPLES

Example 1

Electro-oxidative polymerisation of 2,2'-dipyrrylmethane (IV)

Polymerisation was performed in a single major compartment, 3-electrode cell of total volume ca. 20 cm³, with the counter-electrode separated from the remaining solution by a glass sinter. An oxygen-free nitrogen atmosphere was maintained within the cell and whole arrangement was temperature controlled. The electrolyte employed was vacuum dried poly(ethylene glycol) of average molar mass 200 containing lithium trifluoromethanesulphonate (0.1 mol dm$^{-3}$) and 0.1 mol dm$^{-3}$ 2,2'-dipyrrylmethane, maintained at 52° C. The anode was either a platinum flag or a tin oxide transparent conducting glass with a counter electrode of aluminium and calomel reference electrode. During polymerisation a constant current of 50 μA cm$^{-2}$ was passed at the anode for periods of 30 to 240 minutes depending on the film thickness required. Electrode deposited films had a metallic green-black appearance. The potential-polymerisation time characteristic is given in the graph illustrated in FIG. 1. The thickness of the film after 240 minutes was about 1 mm. Thinner films were also produced using shorter reaction times. The films produced were ethanol washed and dried under vacuum.

The films were found to be flexible and showed a conductivity, measured by a standard 4-point-probe method, of about 1 S cm$^{-1}$ at room temperature.

The uv-visible spectrum of a thin film of the polymeric product, which had a metallic purple and slightly transparent appearance, did not vary over several days after exposure of the film to a laboratory atmosphere, demonstrating its environmental stability.

Elemental analysis (C,H,N) indicated that the polymer to salt ratio in the doped films was ca. 2.4:1 ie (C$_9$H$_7$N$_2$)$_{2.4}$CF$_3$SO$_3$.

The overall combined electrosynthesis and doping procedure may be summerised by the equation:

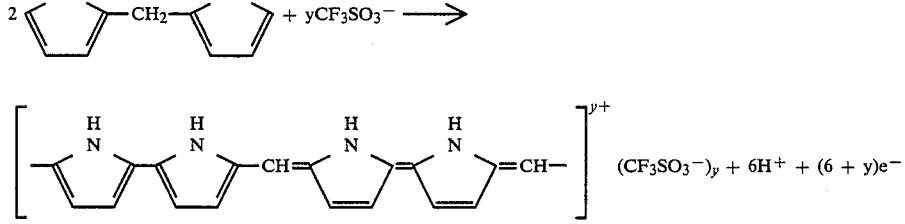

Example 2

Oxidative polymerisation of 2,2'-dipyrrylmethane in aqueous solution

The process used was an interfacial polymerisation where equal volumes of an aqueous 30% (w/v) iron (III) chloride solution and toluene containing 0.05 mol dm$^{-3}$ 2,2'-dipyrrylmethane were allowed to react at room temperature. After 2 hours, a thin metallic green-black polymeric film was apparent at the interface between the organic and aqueous phases. After about 4 hours, the film was thick enough to be lifted intact from the reaction mixture. The retention if the film's colour indicated its stability in an aqueous environment.

Example 3

Synthesis and polymerisation of 2-bromomethylthiophene (VI)

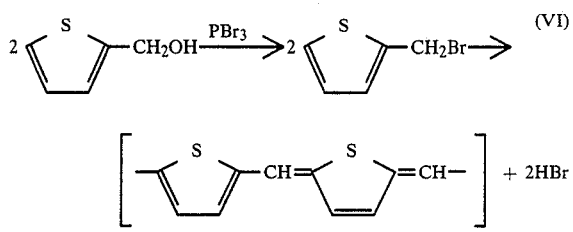

2-Bromomethylthiophene (VI) was made by the method of J. Braun, R. Fussganger and M. Kuhn, Annalen, 1925, 445, 201. The monomer was observed to darken and 'self-polymerise', particularly at elevated (>50° C.) temperatures, with the evolution of hydrogen bromide.

Pressed pellets formed from the powdery product, on doping with iodine vapour gave resultant 4-point-probe conductivities of only 2.5×10$^{-5}$ S cm$^{-1}$. Thus only a partially conjugated system may have been generated or the doping stage may have a low efficiency. However, the conductivities recorded here are similar to those found for doped poly(N-methylpyrrole), ca 10$^{-5}$ S cm$^{-1}$, though are lower than for polypyrrole.

Example 4

Preparation of poly(pyrrole methine) (IX)

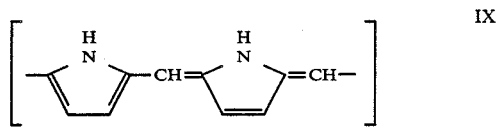

Poly(pyrrole methine) was prepared by the condensation reaction of pyrrole with formaldehyde. Pyrrole and a formalin solution (about 40% w/v formaldehyde) in a pyrrole: formaldehyde molar ratio of about 1:1 were reacted together at ambient temperature under an air atmosphere. The reaction time was varied between 30 minutes and 6 hours for several reaction batches, after which the volalite components of the reaction mixture were removed. Typically, the product was deeply coloured or black. The product varied from a low molar mass polymer (30 minutes reaction time) to a crosslinked brittle solid (6 hours reaction time). When the reaction was allowed to proceed to completion (6 hours reaction time), the infra-red carbonyl absorption was no longer detectable in the product. The products were all found to be air and water stable.

Example 5

Electro-oxidative polymerisation of 2,2'-dithienylmethane (VII)

The process of Example 1 was repeated using 2,2'-dithienylmethane in place of 2,2'-dipyrrylmethane. The temperature, time, and current densities employed during polymerisation were all the same as those used in Example 1. A coherent and deeply coloured film was observed to form on the anode.

The combined reaction and doping step can be summarised by the following equation:

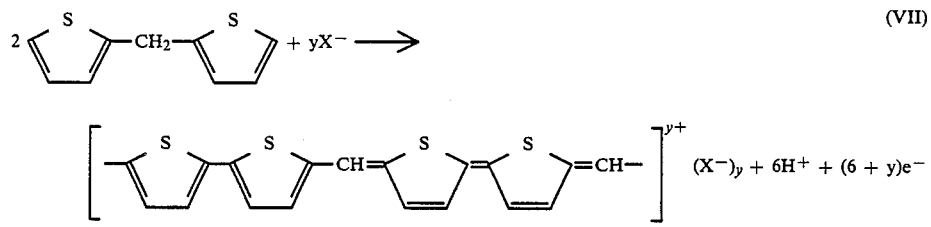

(VII)

Example 6

The monomer (VIII) was isolated by the method of Goldfarb et al (see preparation of 2,2'-dithienylmethane described above) and was electro-oxidatively polymerised using the method of Example 5. The combined reaction and doping step can be summarised by the following equation:

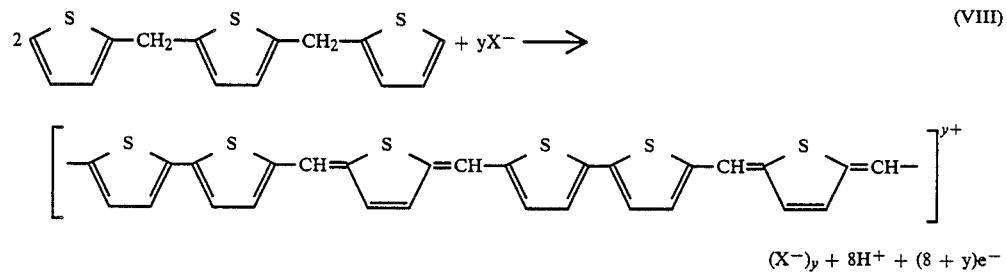

(VIII)

I claim:

1. An electronically conducting organic material comprising a polymer containing along its backbone at least one linear unit of formula I:

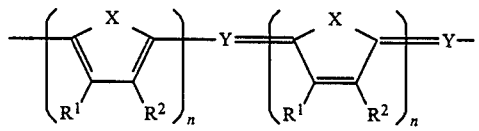

wherein
X is O, S or NR, where R may be H, aryl, substituted aryl, alkyl or substituted alkyl;
$R^1$ and $R^2$, when taken separately, are the same or different and each is selected from the group consisting of H, alkyl, substituted alkyl, alkoxyl, substituted alkoxyl, aryl, substituted aryl, amino, substituted amino, halo and cyano or, when taken together, are benzo or substituted benzo;
Y is $(CR^3)_{2x-1}$ in which $R^3$ is selected from the group consisting of H, alkyl and substituted alkyl and x is an integer from 1 to 6; and
n is an integer from 1 to 4.

2. The electrically conducting organic material according to claim 1, wherein X is selected from the group consisting of NH and S, and $R^1$ and $R^2$ are both H.

3. The electrically conducting organic material according to claim 1, wherein n is 2.

4. The electrically conducting organic material according to claim 1, wherein Y is CH.

5. The electrically conducting organic material according to claim 1, wherein the polymer is additionally doped with n- or p-type dopant ions.

6. The electrically conducting organic material according to claim 5, wherein the molar ratio of the cyclic groups in the polymer to dopant ions in the material is within the range of 1:0.01 to 1:5.

7. An electrode for use in a galvanic cell, a battery, an electrochromic display device or an optical storage device, which has thereon a film of an electrically conducting organic material which has a thickness of from 0.01 microns to 2 mm and which comprises a polymer containing along its backbone at least one linear unit of formula I:

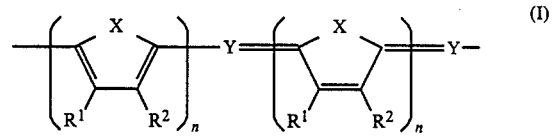

wherein X is O, S or NR where R may be H, aryl, substituted substituted aryl, alkyl substituted alkyl,
$R^1$ and $R^2$, when taken separately, are the same or different and each is selected from the group consisting of H, alkyl, substituted alkyl, alkoxy, substituted alkoxyl, aryl, substituted aryl, amino, substituted amino, halo or cyano or, when taken together, are benzo or substituted benzo;
Y is $(CR^3)_{2x-1}$ in which $R^3$ is selected from the group consisting of H and substituted alkyl and x is an integer from 1 to 6; and
n is an integer from 1 to 4.

8. The electrode according to claim 7, wherein the film has a thickness of from 0.05 microns to 100 microns.

9. A process of depositing an electrically conducting organic material onto a substrate, which comprises electromechanically oxidizing, between an anode and a cathode, a monomer of formula II:

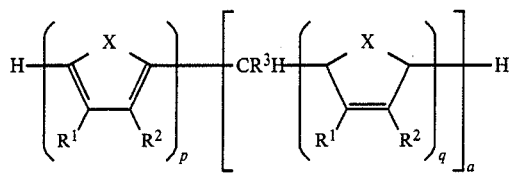

wherein X is O, S or NR, where R is H, aryl, substituted aryl, alkyl or substituted alkyl $R^1$ and $R^2$, when taken separately, are the same or different and each is selected from the group consisting of H, alkyl, substituted alkyl, alkoxyl, substituted alkoxyl, aryl, substituted aryl, amino, substituted amino, halo and cyano or, when taken together, are benzo, optionally substituted banzo, $R^3$ is hydrogen, a $C_1$-$C_5$ alkyl group or a substituted $C_1$-$C_5$ alkyl group, p is 1 or 2 and q is an integer from 1 to 3, dissolved in a solvent, whereby the film is deposited onto the anode.

10. The process according to claim 9, wherein $R^3$ is hydrogen.

11. The process according to claim 9, wherein p is 1.

12. The process according to claim 9, wherein q is 1.

13. The process according to claim 9, wherein X is S or NH and $R^1$ and $R^2$ are both H.

14. The process according to claim 13, wherein the monomer of formula II is 2,2'-dithienylmethane.

15. The process according to claim 13, wherein the monomer of formula II is 2,2'-dipyrrylmethane.

16. The process according to claim 9, wherein the solvent contains an electrolyte compound that is ionizable in the solvent to provide anionic dopant ions that dope the electrically conducting organic material during its formation on the anode.

* * * * *